United States Patent
Yoo

(10) Patent No.: US 9,057,912 B2
(45) Date of Patent: Jun. 16, 2015

(54) BACKLIGHT UNIT FOR DISPLAY DEVICE

(75) Inventor: Chungho Yoo, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 217 days.

(21) Appl. No.: 12/785,254

(22) Filed: May 21, 2010

(65) Prior Publication Data

US 2011/0133674 A1    Jun. 9, 2011

(30) Foreign Application Priority Data

Dec. 3, 2009  (KR) .................. 10-2009-0119384

(51) Int. Cl.
| | |
|---|---|
| G09F 13/04 | (2006.01) |
| G09F 13/08 | (2006.01) |
| G02F 1/1335 | (2006.01) |
| H05B 41/02 | (2006.01) |
| H05B 41/46 | (2006.01) |

(52) U.S. Cl.
CPC .... *G02F 1/133604* (2013.01); *G02F 1/133603* (2013.01); *H05B 41/02* (2013.01); *H05B 41/46* (2013.01)

(58) Field of Classification Search
CPC .................. G02F 1/133603; G02F 1/133604; H05B 41/02; H05B 41/46
USPC .................. 362/97.1, 237, 600–634; 349/61
See application file for complete search history.

(56) References Cited

U.S. PATENT DOCUMENTS

| | | | | |
|---|---|---|---|---|
| 7,530,722 | B2* | 5/2009 | Murai | 362/613 |
| 7,717,601 | B2* | 5/2010 | Tan et al. | 362/613 |
| 2006/0023447 | A1* | 2/2006 | Justel et al. | 362/231 |
| 2007/0002580 | A1* | 1/2007 | Ahn et al. | 362/561 |
| 2007/0153515 | A1* | 7/2007 | Hong et al. | 362/237 |
| 2009/0268125 | A1* | 10/2009 | Kamada et al. | 362/231 |
| 2010/0103340 | A1* | 4/2010 | Park et al. | 349/58 |
| 2010/0123847 | A1* | 5/2010 | Jeong et al. | 349/58 |
| 2010/0123852 | A1* | 5/2010 | Lee et al. | 349/61 |

FOREIGN PATENT DOCUMENTS

KR         20090021534 A       3/2009

OTHER PUBLICATIONS

Office Action issued in corresponding Korean Patent Application No. 10-2009-0119384, mailed Feb. 27, 2013.

* cited by examiner

*Primary Examiner* — Britt D Hanley
*Assistant Examiner* — Jessica M Apenteng
(74) *Attorney, Agent, or Firm* — Brinks Gilson & Lione

(57) ABSTRACT

The present disclosure relates to a backlight unit for flat panel display device. The backlight unit according to the present disclosure comprises: a plurality of light sources; a cover bottom housing the plurality of light source; a PCB attached at outer surface of the cover bottom; an LED installed at back side of the PCB; and an LED hole formed at the cover bottom and introducing a light from the LED to the light sources. Supplying photoelectrons to all fluorescent light sources of the direct type backlight unit with an LED, the fluorescent light sources have an enhanced initial lighting property and can be turned on quickly without a time delay.

9 Claims, 8 Drawing Sheets

BACKLIGHT UNIT FOR DISPLAY DEVICE

This application claims the benefit of Korea Patent Application No. 10-2009-0119384 filed on Dec. 3, 2009, which is incorporated herein by reference for all purposes as if fully set forth herein.

BACKGROUND

1. Field of the Invention

The present disclosure relates to a backlight unit for flat panel display device. Specifically, the present disclosure relates to a backlight unit having a light emitting device (or, LED) for enhancing turn-on property of a fluorescent light source.

2. Discussion of the Related Art

Nowadays, due to the characteristics of light weight, slim thickness, low consumption electric power, the liquid crystal display device (or, LCD) is being widely applied. The LCD is applied to a portable computer such as note book PC, official automation devices, a audio/video devices, etc. The most common LCD shows the picture data by modulating the luminescence of the light incident from the backlight unit by controlling the electric field applied to the liquid crystal layer.

As the liquid crystal display device is not a self-luminescent element, the liquid crystal display device requires a backlight unit for irradiating light to the liquid crystal display panel. There are two kinds of the backlight units for LCD, one is the direct type backlight unit and the other is the edge type backlight system. For the edge type backlight unit, light source such as a fluorescent light source is equipped at the circumferences of the transparent light guide panel. The light radiated from the fluorescent light source to the side surface of the light guide panel is refracted and/or reflected to the front side on which the LCD panel is disposed. On the other hands, for the direct type backlight unit, a plurality of fluorescent light sources are disposed under the back side of the LCD panel so that the light is directly radiated from the light source to the overall surface of the LCD panel. As more light sources are used, the direct type has advantages for making a wide area LCD panel easily and for enhancing the brightness effectively.

FIG. 1 illustrates a liquid crystal display device adapting a direct type backlight unit according to the related art. Referring to FIG. 1, a liquid crystal display device according to the related art comprises a panel guide PG, a liquid crystal display panel LCDPC disposed into the panel guide PG, a cover bottom CBC, a backlight unit BLUC disposed into the cover bottom CBC and a top case TC for fastening the liquid crystal display panel LCDPC.

As the panel guide PG is made by the molding process, the inside wall of the panel guide PG has stepped profile. Due to the stepped side, the liquid crystal display panel LCDPC can be mounted inside of the panel guide PG.

The liquid crystal display panel LCDPC comprises a color filter array panel and a thin film transistor (or, TFT) array panel. Between the color filter array panel and the TFT array panel, a plurality of liquid crystal cells are arrayed in active matrix type. At each liquid crystal cell, a thin film transistor is provided for applying a video signal. As the refraction ratio of the liquid crystal cell is changed according to the video signal, the picture and/or video corresponding to the video signal is represented on the liquid crystal display panel LCDPC. On the TFT array panel of the liquid crystal display panel LCDPC, attached are a gate tape carrier package in which a plurality of gate IC for generating the gate signals and a data tape carrier package in which a plurality of data IC for generating the data signals.

The top case TC is made as a closed rectangular rim shape having a horizontal part and a vertical part, which are bent perpendicularly each other. The top case TC surrounds the circumferences of the liquid crystal display panel LCDPC and the panel guide PG.

The cover bottom CBC comprises a bottom surface and four side surfaces vertically surrounding the bottom surface. That is, the cover bottom CBC has opened top portion. At outside of any side surfaces, there may be a support side surrounding the circumference of the cover bottom CBC.

The backlight unit BLUC comprises a plurality of light source LSC generating light, a reflection sheet REFC disposed under the light sources LSC, a diffusion plate DIFC covering the light sources LSC, and optical sheets OPTC disposed on the diffusion plate DIFC.

Each of the plurality of light source LSC is, for example, an external electrode fluorescent lamp (EFFL) comprising a glass tube, an inertia gas filling up the glass tube, and anode and cathode electrodes built at each ends of the glass tube, respectively. The inertia gas is filled with the glass tube and a fluorescent material is coated at the inner surface of the glass tube. The plurality of light sources LSC are held by lamp holders LH mounted on the bottom surface of the cover bottom CBC.

The diffusion plate DIFC diffuses the light radiated from the plurality of the light source LSC to the liquid crystal display panel LCDPC with widen incident angle. The diffusion plate DIFC can be made of polymethylethacrylate (PMMA) material or glass for preventing deformation by heat from the light source LSC.

In this structure, the plurality of the light sources LSC are housed in a dark space so that the light sources LSC can be left under dark conditions for a long time. Specifically, when the light sources LSC are fluorescent lamps, as they are left under dark conditions for a long time, the existing probability of electrons in the lamps can be reduced remarkably. At this situation, if a power for the lamps is turned on, the time interval required for forming plasma in the fluorescent lamps may be longer than normal condition. As a result, a turn-on problem may be occurred in which the fluorescent lamps are turned on after the liquid crystal display device starts representing the video data.

BRIEF SUMMARY

A backlight unit according to the present disclosure comprises: a plurality of light sources; a cover bottom housing the plurality of light sources; a PCB attached at outer surface of the cover bottom; an LED installed at back side of the PCB; and an LED hole formed at the cover bottom and introducing a light from the LED to the light sources.

A backlight unit for flat panel display device according to the present disclosure is equipped with an LED at the PCB mounted at the outside of the cover bottom. Therefore, it is possible to supply the photoelectrons to the light source which can be left under dark conditions for a long time. As a result, the LED helps the initial lighting of the light source. Specifically, according to the present disclosure, with just one LED, it is possible to supply the photoelectrons to all of the fluorescent lamps of the direct type backlight unit. Therefore, the fluorescent lamps are turned on without a time delay eventhough they have been left under dark conditions for a long time. The present disclosure suggests prevents the problems at initial lighting and enhances the reliability of the fluorescent lamps of the backlight unit.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Figure 1:
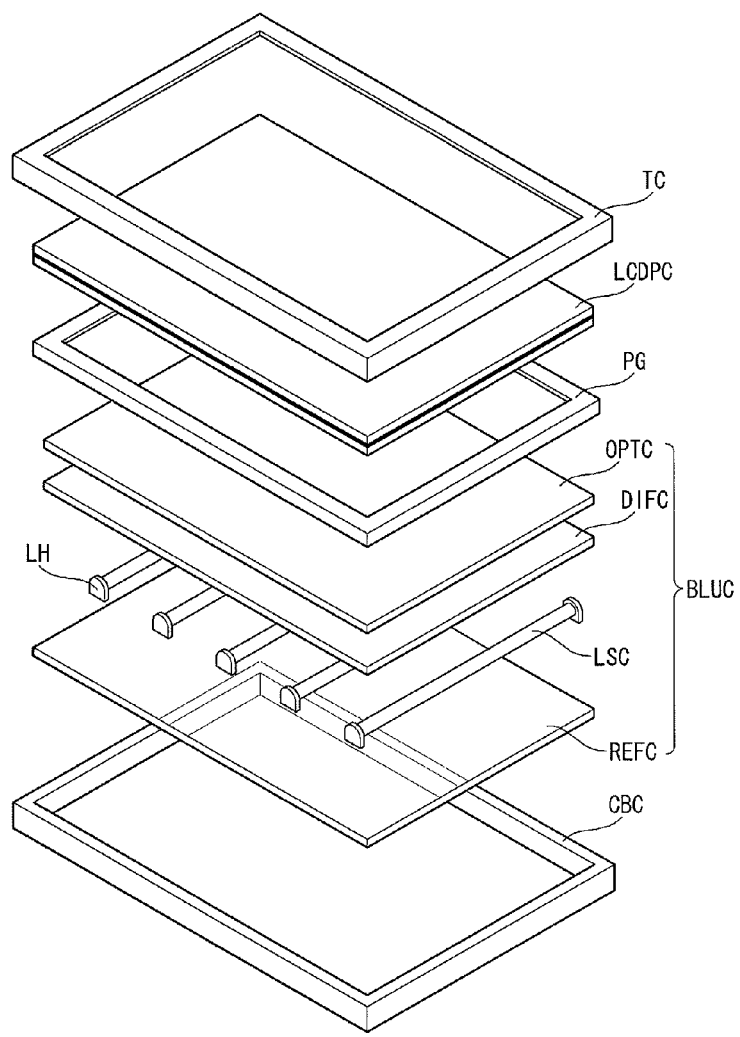
FIG. 1 is an assembling diagram illustrating a liquid crystal display device adopting the direct type backlight unit according to the relative art.

Referring to attached figures, the organic electroluminescent display device according to the preferred embodiment of the present disclosure will be explained in detail. Advantages and features of the present invention and a method of achieving the advantages and the features will be apparent by referring to embodiments described below in detail in connection with the accompanying drawings, FIGS. 2 to 8Aa and 8B. Like reference numerals designate like elements throughout the detailed description.

Figure 2:
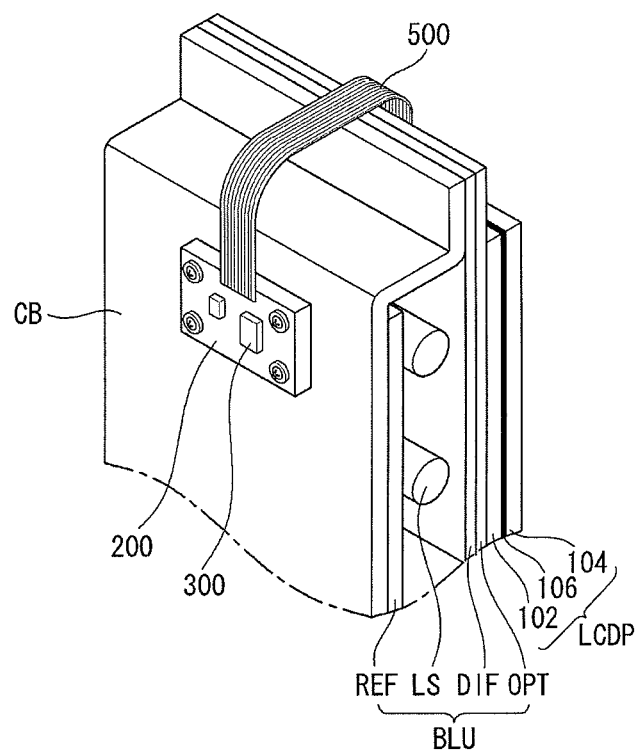
FIG. 2 is a part diagram illustrating a liquid crystal display device having a backlight unit according to the first embodiment of the present disclosure.
Figure 3:
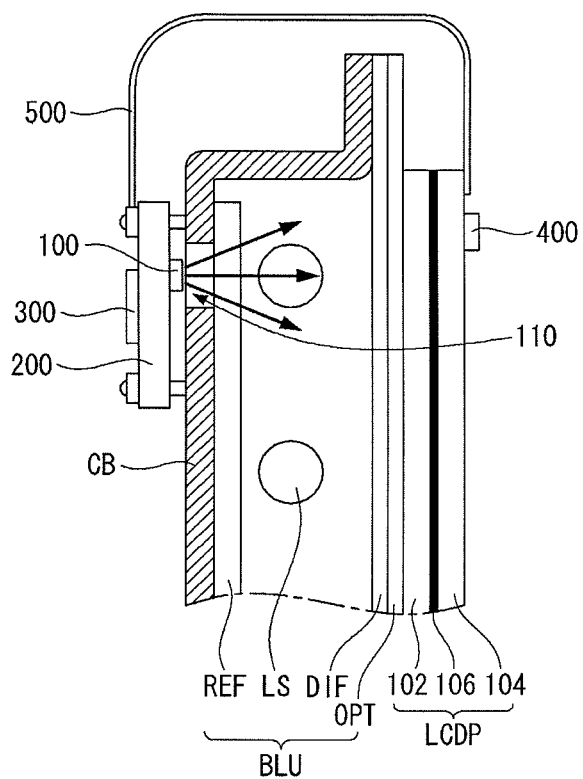
FIG. 3 is a cross-sectional diagram illustrating a structure of a liquid crystal display device having a backlight unit according to the first embodiment of the present disclosure.

FIG. 2 is a part diagram illustrating a liquid crystal display device having a backlight unit according to the first embodiment of the present disclosure. FIG. 3 is a cross-sectional diagram illustrating a structure of a liquid crystal display device having a backlight unit according to the first embodiment of the present disclosure. As the FIGS. 2 and 3 are focusing on the backlight unit, some other elements may be needed additionally.

In the first preferred embodiment of the present disclosure, the backlight unit comprises an LED 100 for providing photoelectrons to the light sources LS (i.e. fluorescent lamp) left under dark conditions as the light sources LS are mounted inside of the cover bottom CB (or, backlight case). This LED 100 is an electronic device requiring a electric power, also. The printed circuit board 200 (or PCB) is equipped at the outside of the cover bottom CB for supplying an electric power and electric signals to the liquid crystal display device LCDP and the backlight unit BLU. Therefore, the LED 100 can be installed at the PCB 200 to supply light for stimulating initial turn-on to the light source LS.

Referring to FIGS. 2 and 3, the liquid crystal display device according to the first embodiment of the present disclosure comprises a liquid crystal display panel LCDP for representing video data, a backlight unit BLU for irradiating light to the liquid crystal display panel LCDP, a cover bottom CB for housing and supporting the backlight unit BLU, a PCB 200 disposed at rear side of the cover bottom CB for generating the driving signal required to operate the liquid crystal display panel LCDP, and IC 300 including a timing controller IC (T-CON) and a power IC mounted on the PCB 200.

The liquid crystal display panel LCDP includes a lower substrate 102, an upper substrate 104, and a liquid crystal cells 106 therebetween. Spacers (not shown) can be included for maintaining the cell gap between the upper substrate 104 and the lower substrate 102 evenly. The upper substrate 104 of the liquid crystal display panel LCDP comprises color filters (not shown), black matrixes (not shown) and so on. The lower substrate 102 of the liquid crystal display panel LCDP comprises signal lines such as data lines and gate lines crossing each other, and thin film transistors (TFTs) at the crossing corner of the signal lines. Responding to the scan signal through the gate line, the TFT supplies the data signal from the data line to the liquid crystal cells 106. At the pixel area defined by the data line and gate line, a pixel electrode is formed. Furthermore, a common electrode facing with the pixel electrode is also formed in the pixel area. For the vertical electric field type liquid crystal display panel such as a TN (Twisted Nematic) mode or a VA (Vertical Alignment) mode, the common electrode is formed at the upper substrate 104. Contrary, for the horizontal electric field type liquid crystal display panel such as IPS (In Plane Switching) mode or a FFS (Fringe Field Switching) mode, the common electrode is formed at the lower substrate 102 with the pixel electrode.

At one side of the liquid crystal panel LCDP, pad areas on which the data lines and the gate lines are connected are formed. At these pad areas, the driver ICs 300 and 400 for supplying the driving signals to the TFTs are mounted in COG (Chip On Glass) method. According to the control signal from the PCB 200, the driver IC 400 supplies the video signal to the liquid crystal display panel LCDP. At each inner surfaces of the lower substrate 102 and the upper substrate 104, alignment layers are disposed, respectively, for presetting the pre-tilt angle of the liquid crystal molecules. At the outer surfaces of the lower substrate 102 and the upper substrate 104, an upper polarizing sheet and an lower polarizing sheet are attached, respectively.

The backlight unit BLU comprises a plurality of light source LS irradiating light to the liquid crystal display panel LCDP, a reflection sheet REF disposed under the light source LS, and, a plurality of optical sheet OPT between the light source LS and the liquid crystal display panel LCDP. For the light source LS, an external electrode fluorescent lamp is used. The direct type backlight unit has the merits of increasing brightness and for enlarging the lighting area size as adopting light sources more and more.

The cover bottom CB includes a bottom surface and four side surfaces vertically extended from each side of the bottom surface. The cover bottom CB houses and supports the backlight unit BLU. At the rear surface of the cover bottom CB, the PCB 200 can be attached by the fastening elements such as screw bolts.

A FPC (Flexible Printed Circuit) 500 comprises a base film layer made of polyimide, a conductive layer including a plurality of conductive wires of which each of them has a predetermined width on the base film layer, and a cover film layer mad of polyimide covering the conductive layer. After assembling the liquid crystal display panel LCDP and the cover bottom CB, one side of the FPC 500 is electrically connected to the pad electrode of the driver IC 400 using an ACF (Anisotropic Conductive Film). After that, the other side of the FPC 500 electrically connected to the PCB 200 including the IC 300 such as T-CON or power IC. From the liquid crystal display panel LCDP to the PCB 200, the FPC 500 can be easily bent because it is made of flexible materials.

The PCB 200 includes a substrate, a solderresist layer, and a copper film layer between the substrate and the solderresist layer. Furthermore, the PCB 200 is equipped with various circuit elements connected to the copper film layer by penetrating the solderresist layer. The PCB 200 is fixed to the rear surface of the cover bottom CB using the fastening elements. For the circuit elements, there are the power IC for supplying the electric power to the liquid crystal display panel LCDP, and the timing controller (T-CON) for controlling the video signal. The PCB 500 is electrically connected to the FPC 500 to supply the driving signal and power signal to the driver IC 400 of the liquid crystal display panel LCDP.

On the back surface of the PCB 200 attached on the rear surface of the cover bottom CB, an LED 100 is additionally equipped. An LED hole 110 is formed to penetrate the bottom surface of the cover bottom CB at the position corresponding to the location of the LED 100. Then, the LED 100 can irradiate LED light into the inner space of the cover bottom CB through the LED hole 110.

When the liquid crystal display device is turned on, the electric power is supplied to the PCB 200. Then, the liquid crystal display panel LCDP and the light source LS of the backlight unit BLU can be supplied with the electric power. At the same time, the electric power is also supplied to the LED 100 mounted on the back side of the PCB 200. So, the LED 100 will be turned on. Through the LED hole 110 of the cover bottom CB, the LED light is irradiated to the light sources LS. This means that the photoelectrons are supplied to the fluorescent lamps at initial lighting time. Therefore, the fluorescent lamp can be turned on without a time delay eventhough the lamps are left under dart conditions for a long time.

In the first embodiment, as the LCE 100 is located at the bottom surface of the cover bottom CB, the light irradiated from the LED 100 should pass through the reflection sheet REF to reach to the light source LS. Therefore, the light amount can be reduced by the reflection sheet REF so that the LED 100 cannot provide sufficient effects to help initial lighting of the light source LS. Furthermore, as the size of PCB 200 is getting smaller and smaller for minimizing the size of the PCB 200 and lightening the weight of the liquid crystal display device, the LED 100 can only help restricted numbers of the initial lighting of light source LS. For example, as shown in FIG. 3, the LED 100 may supply photoelectrons only one light source LS disposed where the PCB 200 is located. In FIG. 3, the arrow marks represent the pathes of the light irradiated from the LED 100 into the cover bottom CB through the LED hole 110.

Figure 4:
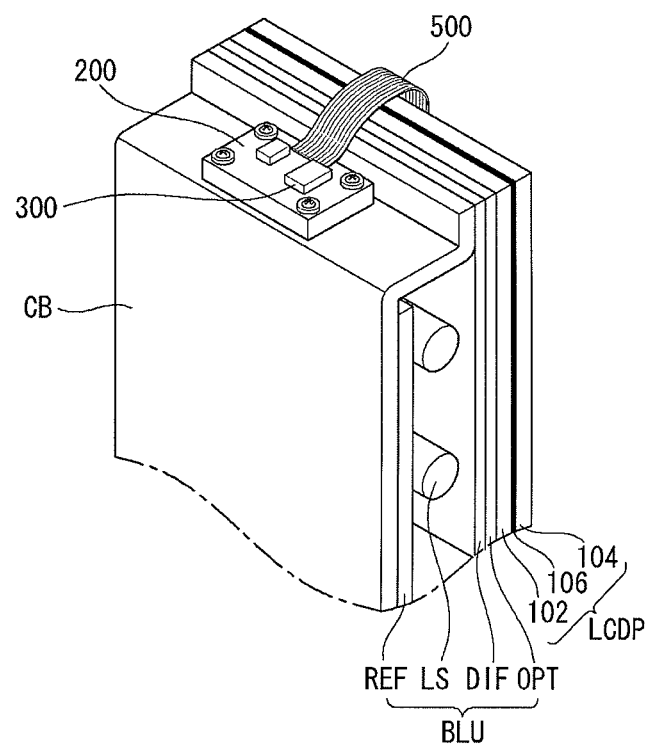
FIG. 4 a part diagram illustrating a liquid crystal display device having a backlight unit according to the second embodiment of the present disclosure.
Figure 5:
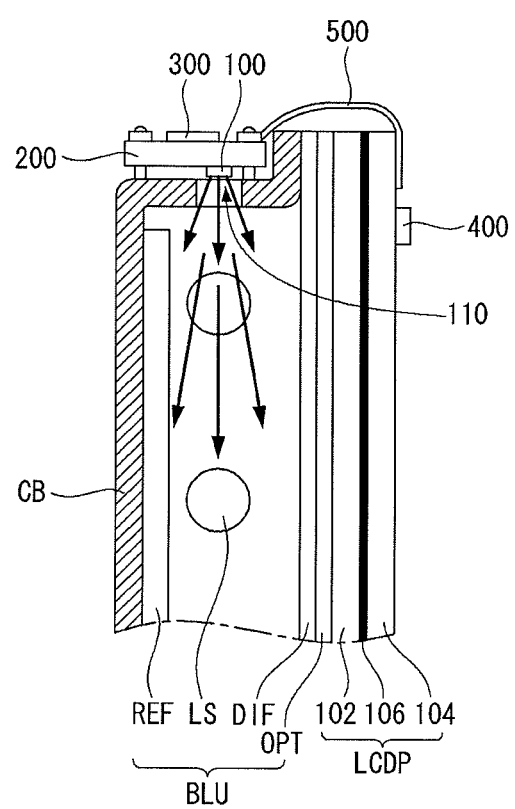
FIG. 5 is a cross-sectional diagram illustrating a structure of a liquid crystal display device having a backlight unit according to the second embodiment of the present disclosure.

In the second preferred embodiment of the present disclosure, provided is a backlight unit in which one LED supplies the photoelectrons to all light sources of the direct type backlight unit, and there is no obstacle between the LED and the light sources so that the LED can effectively help the initial lighting of the light sources. FIG. 4 a part diagram illustrating a liquid crystal display device having a backlight unit according to the second embodiment of the present disclosure. FIG. 5 is a cross-sectional diagram illustrating a structure of a liquid crystal display device having a backlight unit according to the second embodiment of the present disclosure.

Many elements of the second embodiment are the same with those of the first embodiment. The different point is that the PCB 200 is located at the side surface of the cover bottom CB not at the bottom surface. The side surface of the cover bottom CB has much smaller area than the bottom surface. Therefore, it is not easy to install the PCB 200 having a number of ICs or the large sized ICs at the side surface of the cover bottom CB. As the degree of intergration of the IC is increasing and it is possible to make the driver IC as one small chip IC, the size of PCB 200 is getting smaller and smaller. So, it is possible to find way to install the PCB 200 on the side surface of the cover bottom CB.

According to the second embodiment of the present disclosure, an LED 100 is installed at the back side of the PCB 200 mounted at outside of any one side surface of the cover bottom CB. An LED hole 110 is formed to penetrate the side surface of the cover bottom CB at the position corresponding to the location of the LED 100. Then, the LED 100 can irradiate LED light into the inner space of the cover bottom CB through the LED hole 110. In FIG. 5, the arrow marks represent the pathes of the light irradiated from the LED 100 into the cover bottom CB through the LED hole 110.

When the liquid crystal display device is turned on, the electric power is supplied to the PCB 200. Then, the liquid crystal display panel LCDP and the light source LS of the backlight unit BLU can be supplied with the electric power. At the same time, the electric power is also supplied to the LED 100 mounted on the back side of the PCB 200. So, the LED 100 will be turned on. Through the LED hole 110 at the side surface of the cover bottom CB, the LED light is irradiated to the light sources LS. This means that the photoelectrons are supplied to the fluorescent lamps at initial lighting time. Therefore, the fluorescent lamp can be turned on without a time delay eventhough the lamps are left under dart conditions for a long time.

Figure 8A:
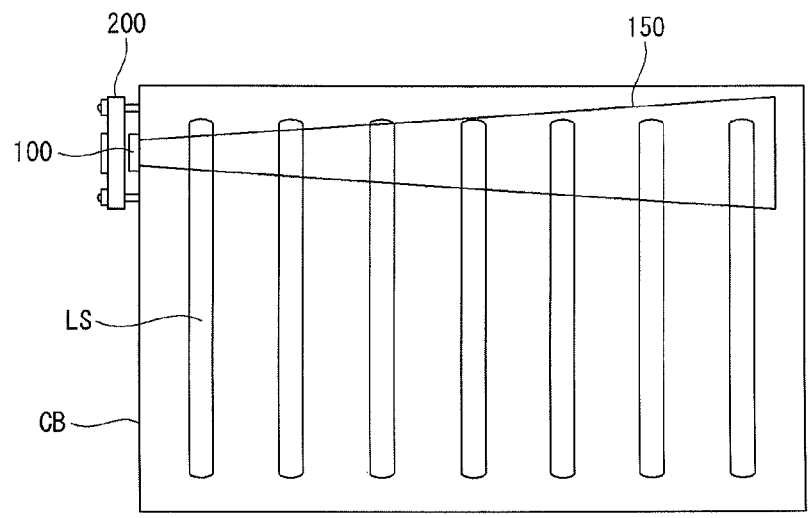
FIGS. 8A and 8B are plan views illustrating an arrangement structure of an LED and fluorescent lamps according to the present disclosure.
Figure 8B:
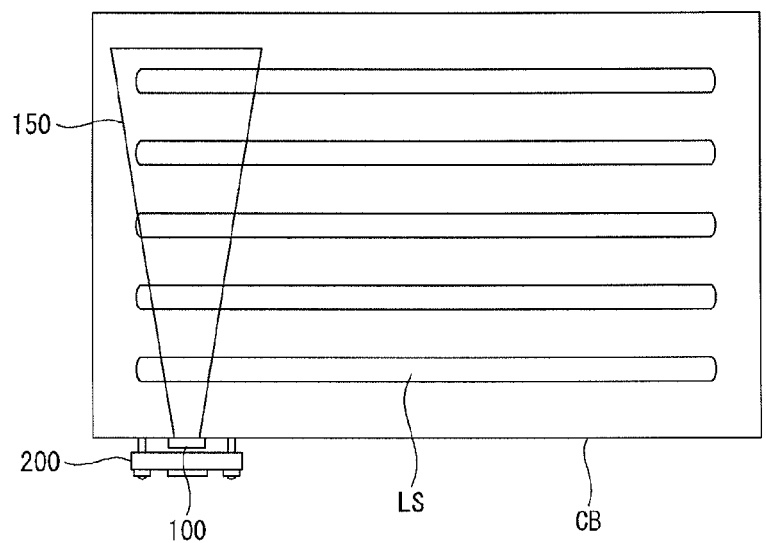

According to the second embodiment of the present disclosure, as the LED 100 is located at the side surface of the cover bottom CB, there is no obstacle between the LED 100 and the light sources LS. Therefore, the light amount is not reduced and the LED 100 has full effects to the fluorescent lamps. Furthermore, with only one LED 100, it is possible to supply photoelectrons to all lamps of the backlight unit BLU. As shown in FIG. 8A, when the light source LS is a thin and long fluorescent lamp, there is one case that the long axis of the lamp is parallel to the short side of the cover bottom CB and a plurality of lamps are arrayed along the long side of the cover bottom CB. In this case, the LED 100 preferably is located at the short side of the cover bottom CB. Then, it is possible that the light 150 irradiated from the LED 100 reaches to all of the lamps to supply the photoelectrons. On the contrary, there is another case that the long axis of the lamp is parallel to the long side of the cover bottom CB and a plurality of lamps are arrayed along the short side of the cover bottom CB. In that case, the LED 100 preferably is located at the long side of the cover bottom CB. Then, it is also possible that the light 150 irradiated from the LED 100 reaches to all of the lamps to supply the photoelectrons. FIGS. 8Aa and 8B are plan views illustrating an arrangement structure of an LED and fluorescent lamps according to the present disclosure.

Figure 6:
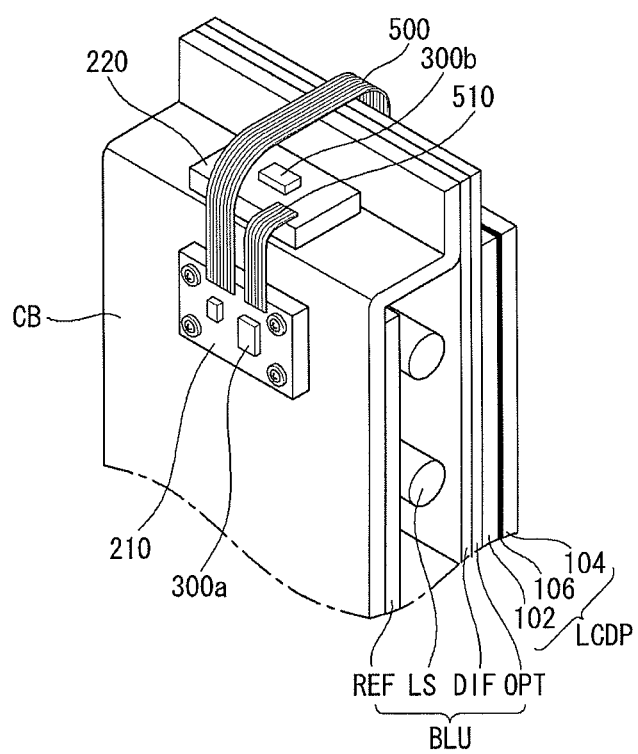
FIG. 6 a part diagram illustrating a liquid crystal display device having a backlight unit according to the third embodiment of the present disclosure.
Figure 7:
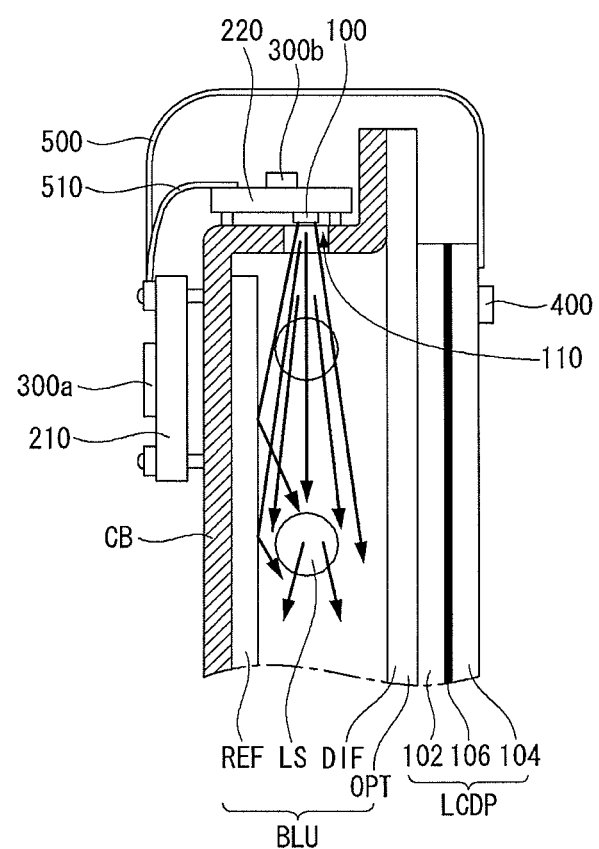
FIG. 7 is a cross-sectional diagram illustrating a structure of a liquid crystal display device having a backlight unit according to the third embodiment of the present disclosure.

In the third preferred embodiment of the present disclosure, explained is the case that it is impossible to configure PCB with all ICs for driving the liquid crystal display device. FIG. 6 a part diagram illustrating a liquid crystal display device having a backlight unit according to the third embodiment of the present disclosure. FIG. 7 is a cross-sectional diagram illustrating a structure of a liquid crystal display device having a backlight unit according to the third embodiment of the present disclosure.

Many elements of the third embodiment are the same with those of the second embodiment. The different point is that a first PCB 210 including a first set of IC 300a is located at the rear side of the bottom surface of the cover bottom CB, and a second PCB 220 including a second set of IC 300b and an LED 100 is located at outside of any one side surface of the cover bottom CB any one side surface of the cover bottom CB. Specifically, the LED 100 is mounted on the back side of the second PCB 220 located on the side surface of the cover bottom CB. An LED hole 110 is formed to penetrate the side surface of the cover bottom CB at the position corresponding to the location of the LED 100. Then, the LED 100 can irradiate LED light into the inner space of the cover bottom CB through the LED hole 110. In FIG. 7, the arrow marks represent the pathes of the light irradiated from the LED 100 into the cover bottom CB through the LED hole 110. The first PCB 210 and the second PCB 220 are linked together each other through a second FPC 510. Via the second FPC 510, for example, the driving signals and power signals for second set of IC 300b and the LED 100 are received from the first PCB 210.

When the liquid crystal display device is turned on, the electric power is supplied to the first PCB 210 and the second PCB 220. Then, the liquid crystal display panel LCDP and the light source LS of the backlight unit BLU can be supplied with the electric power. At the same time, the electric power is also supplied to the LED 100 mounted on the back side of the second PCB 220. So, the LED 100 will be turned on. Through the LED hole 110 at the side surface of the cover bottom CB, the LED light is irradiated to the light sources LS. This means that the photoelectrons are supplied to the fluorescent lamps at initial lighting time. Therefore, the fluorescent lamp can be turned on without a time delay eventhough the lamps are left under dart conditions for a long time.

According to the third embodiment of the present disclosure, as the LED 100 is also located at the side surface of the cover bottom CB, there is no obstacle between the LED 100 and the light sources LS. Therefore, the light amount is not reduced and the LED 100 has full effects to the fluorescent lamps. Furthermore, with only one LED 100, it is possible to supply photoelectrons to all lamps of the backlight unit BLU. As shown in FIG. 8A, when the light source LS is a thin and long fluorescent lamp, there is one case that the long axis of the lamp is parallel to the short side of the cover bottom CB and a plurality of lamps are arrayed along the long side of the cover bottom CB. In this case, the LED 100 preferably is located at the short side of the cover bottom CB. Then, it is possible that the light 150 irradiated from the LED 100 reaches to all of the lamps to supply the photoelectrons. On the contrary, there is another case that the long axis of the lamp is parallel to the long side of the cover bottom CB and a plurality of lamps are arrayed along the short side of the cover bottom CB. In that case, the LED 100 preferably is located at the long side of the cover bottom CB. Then, it is also possible that the light 150 irradiated from the LED 100 reaches to all of the lamps to supply the photoelectrons.

While the embodiment of the present invention has been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

The invention claimed is:

1. A backlight unit of a flat panel display device comprising:
   a plurality of thin tube type light sources, the light sources each having a long axis;
   a cover bottom having bottom surface and four vertical side surfaces and housing the plurality of light sources inside the cover bottom;
   a printed circuit board (PCB) attached at outside of one vertical side surface of the cover bottom;
   an LED installed at back side of the PCB facing the outside of the vertical side surface of the cover bottom; and
   an LED hole formed to penetrate the vertical side surface of the cover bottom for introducing a light from the LED to the light sources,
   wherein the PCB and the LED are disposed at the one vertical side surface that is parallel to the long axes of the light sources and the LED is disposed at the same height as the plurality of light sources such that the LED is disposed on the same plane as the light sources to face side surfaces of the light sources and irradiates light directly to the light sources without being obstructed by any component between the LED and the light sources along a direction which crosses the long axes of all of the light sources arrayed in the cover bottom, and the light from the LED supplies photoelectrons to all light sources.

2. The device according to the claim 1, wherein the light sources comprise thin tube type fluorescent lamps.

3. The device according to the claim 2, wherein each of the lamps is disposed such that the long axis of the lamp is parallel to a short side of the cover bottom, and the plurality of light sources are arrayed along a long side of the cover bottom;
   the LED is located at the short side of the cover bottom;
   the LED hole is formed at the short side of the cover bottom; and
   the light irradiated from the LED passes across the all lamps in the cover bottom.

4. The device according to the claim 3, wherein the PCB further comprises an IC for driving the plurality of the light sources.

5. The device according to the claim 3, further comprising:
   a diffusion plate disposed on the light source diffusing lights radiated from the light sources;
   an optical film focusing the diffused lights to the flat panel; and
   a reflection film between the plurality of light sources and a bottom surface of the cover bottom to reflect the light to the flat panel.

6. The device according to the claim 2, wherein each of the lamps is disposed such that the long axis of the lamp is parallel to a long side of the cover bottom, and the plurality of light sources are arrayed along a short side of the cover bottom;
   the LED is located at the long side of the cover bottom;
   the LED hole is formed at the long side of the cover bottom; and
   the light irradiated from the LED passes across all the lamps in the cover bottom.

7. The device according to claim 1, further comprising a flexible printed circuit that electrically connects the PCB to a driver IC at a front face of the flat panel display device.

8. The device according to claim 7, wherein the PCB supplies the driving signal and power signal to the driver IC of the liquid crystal display panel through the flexible circuit board.

9. The device according to claim 7, wherein the PCB includes a power IC for supplying electric power to the liquid crystal display panel through the flexible circuit board.

* * * * *